(12) United States Patent
Ferron

(10) Patent No.: US 11,963,640 B2
(45) Date of Patent: Apr. 23, 2024

(54) VESSEL FOR COOKING FOOD AND ITS RESPECTIVE THERMAL SIGNALLING DEVICE

(71) Applicant: ZWILLING BALLARINI ITALIA SRL, Rivarolo Mantovano (IT)

(72) Inventor: Francesco Ferron, Casalmaggiore (IT)

(73) Assignee: ZWILLING BALLARINI ITALIA SRL, Rivarolo Mantovano (IT)

( * ) Notice: Subject to any disclaimer, the term of this patent is extended or adjusted under 35 U.S.C. 154(b) by 646 days.

(21) Appl. No.: 17/278,084

(22) PCT Filed: Sep. 19, 2019

(86) PCT No.: PCT/IB2019/057914
§ 371 (c)(1),
(2) Date: Mar. 19, 2021

(87) PCT Pub. No.: WO2020/070572
PCT Pub. Date: Apr. 9, 2020

(65) Prior Publication Data
US 2021/0345834 A1    Nov. 11, 2021

(30) Foreign Application Priority Data
Oct. 1, 2018   (IT) .................. 102018000009069

(51) Int. Cl.
*A47J 45/06* (2006.01)
*A47J 36/02* (2006.01)
(Continued)

(52) U.S. Cl.
CPC ............. *A47J 45/068* (2013.01); *A47J 36/02* (2013.01); *A47J 37/10* (2013.01); *A47J 45/061* (2013.01); *G01K 11/00* (2013.01); *A47J 2202/00* (2013.01)

(58) Field of Classification Search
CPC .................................................... A47J 45/068
See application file for complete search history.

(56) References Cited

U.S. PATENT DOCUMENTS 4,448,147 A * 5/1984 Dewaegheneire ....... G12B 1/00
60/527
5,673,458 A * 10/1997 Raoult .................. A47J 45/061
16/425
(Continued)

FOREIGN PATENT DOCUMENTS

GB    2315126 A  *  1/1998  ............. G01K 5/483
GB    2429285 A     2/2007
(Continued)

OTHER PUBLICATIONS

International Search Report and Written Opinion mailed Nov. 21, 2019 for PCT/IB2019/057914 to Zwilling Ballarini Italia SRL filed Sep. 19, 2019.

*Primary Examiner* — John J Norton
(74) *Attorney, Agent, or Firm* — Vorys, Sater, Seymour and Pease LLP

(57) ABSTRACT

A cooking food vessel including a metal body, at least one handle, constrained to a portion of the metal body via a metal fastening element, and at least one thermal signalling device, applied on a portion of the handle placed at a respective component having thermal conductivity properties. The thermal signalling device is provided with at least one indicating element operatively connected to a respective actuating element made of a shape-memory alloy. The actuating element is a shape-memory coil spring, indirectly contacting the component having thermal conductivity properties and configured to switch from a first non-operative configuration, wherein is inactive, to a second operative configuration, wherein is stretched when a predefined temperature value is achieved. Between the actuating element (Continued)

and the component having thermal conductivity properties is interposed a metal base for modulation and/or thermal enhancement which transfers heat to such actuating element.

18 Claims, 3 Drawing Sheets

(51) Int. Cl.
*A47J 37/10* (2006.01)
*G01K 11/00* (2006.01)

(56) References Cited

U.S. PATENT DOCUMENTS

| | | | |
|---|---|---|---|
| 2004/0184511 A1* | 9/2004 | Kwon | A47J 45/068 374/208 |
| 2008/0022861 A1* | 1/2008 | Ferron | A47J 45/068 99/342 |

FOREIGN PATENT DOCUMENTS

| | | |
|---|---|---|
| KR | 20130068095 A | 6/2013 |
| WO | 2006091013 A1 | 8/2006 |

\* cited by examiner

VESSEL FOR COOKING FOOD AND ITS RESPECTIVE THERMAL SIGNALLING DEVICE

CROSS-REFERENCE TO RELATED APPLICATIONS

This is a § 371 National Stage Application of International Application No. PCT/IB2019/057914 filed on Sep. 19, 2019, claiming the priority of Italian Patent Application No. 102018000009069 filed on Oct. 1, 2018.

The present invention generally relates to a vessel for cooking food and, in particular, to a thermal signalling device for vessels for cooking food.

In the technical field of vessels for cooking food systems and devices are known preset for informing a user of a vessel for cooking food, such as for instance a pan, about the thermal condition reached by the vessel itself, so as to provide for a correct cooking and make it possible to monitor cooking and adjust the amount of heat to supply. The heat supplied by way of gas or electricity is usually high upon start of use, in order to bring the cooking vessel to a desired temperature, whereas its amounts shall be reduced once reaching the desired temperature, in order not to overheat the cooking vessel, which would damage quality of cooking. Pans are usually the cooking vessel for which the control of their respective thermal condition is most critical, in that such type of kitchen utensil needs a thermal control because of it being used at high temperatures not damped by liquid contents.

The most used thermal signalling systems make reference to chromatic variations provided by pigments which, upon reaching specific temperatures, change colour, thus providing a visual information. Thermochromic systems exist that are placed directly inside the cooking vessel, via pigments incorporated in the non-stick coating placed on the inner surface of the vessel itself. If change of colour is expected to take place at a predefined temperature, such as for instance 180° C., the colour changes as soon as this predefined temperature is reached, whereby the user can adjust the thermal power to be supplied to the cooking vessel to his/her requirements.

The thermochromic systems feature two main limitations:
- pigments shall be resistant to highest cooking temperatures, whose peaks might reach 300° C. The change of colour of (inorganic) pigments resistant to high temperatures is very slender and difficult to appreciate. Comparison systems activated in a more or less wide zone of the bottom of the cooking vessel are used to identify such change of colour;
- the bottom of the cooking vessel, where the colour-changing areas are placed, is usually covered by the food to be cooked, so that the view of the variation of colour is prevented or at least limited.

These are the reasons why thermal signalling systems have been implemented that aim at overcoming the above described limitations, while using thermochromic pigments. In these thermal signalling systems, the thermochromic pigments are placed into paints which coat specific components placed in the immediate periphery of the cooking vessel. For example, should the cooking vessel be a pan, the thermochromic pigments are placed on that metal part of the handle that is closest to the edge of the pan.

However, in a cooking vessel provided with these thermal signalling systems, the increase of temperature at the component that incorporates the thermochromic pigments takes place after a certain time delay with respect to the increase of temperature taking place at the cooking bottom. This occurs because of the time necessary for heat to be transferred from the cooking bottom, which is closer to the thermal source, to the component under consideration. For example, the cooking bottom might be at a temperature of 180° C., whereas the component that incorporates the thermochromic pigments might be at a temperature not exceeding 60° C. Therefore, pigments that change colour at a temperature of 60° C. will be used to signal that the cooking bottom reached a temperature of 180° C.

The advantage of using pigments that change colour at a low temperature is in that the difference in colour is very well defined, for example from green to red. However, such advantage is partially neutralized by the thermal resistance limitations of such (organic) pigments which tend to deactivate and not to come back to their initial status if submitted to a long-lasting cooking with temperatures exceeding 200° C.

More sophisticated thermal signalling systems also exist, based on the use of thermocouples incorporated inside the metal thickness of the bottom of the cooking vessel. The temperature assessed by the thermocouples is finally read and signalled by a battery powered electronic device, generally placed at the end section of the handle of the cooking vessel.

The thermocouple-based thermal signalling systems feature at least two main limitations:
- they require a complex radial drilling operation of the bottom of the cooking vessel in order to place the thermocouple therein;
- by its nature and because of the presence of a battery, the electronic device used to read and signal the temperature does not resist to the water and to the temperature of a dishwasher, and in any case to an even accidental exposure to high temperatures, as it often happens on a cooktop.

Also, the thermocouple-based thermal signalling systems are expensive and little practical, because of the requirement for them of being removable.

Finally, thermal signalling systems for cooking vessel exist based on shape-memory alloys (SMA). These thermal signalling systems such as, for instance, that described in KR 2013-0068095 A, use an actuator made of a shape-memory alloy which deforms as the temperature increases, and then comes back to its own initial conditions under ambient temperature conditions.

In the specific case of KR 2013-0068095 A, the actuator is formed of a sheet made of a shape-memory alloy and is placed in a portion of the handle of a pan. This sheet, remotely getting hot, deforms and drives a graduated cap which, moving, operates as a temperature indicating element. Despite this sheet being made of a shape-memory alloy, it does not provide a precise and immediate return to its own initial shape under ambient temperature conditions. In addition, after using the pan it might be necessary to manually zero the position of the graduated cap.

A further thermal signalling system, applied on a vessel for cooking food according to the preamble of claim 1, is described in document GB 2 429 285 A.

An object of the present invention is therefore that of providing a thermal signalling device for a vessel for cooking food that is capable of solving the above-mentioned drawbacks of the prior art in an extremely simple, cost-effective, and particularly functional manner.

In details, an object of the present invention is that of providing a thermal signalling device for a vessel for cooking food that is thermally more stable and reliable than the devices according to the prior art.

Another object of the present invention is that of providing a thermal signalling device for a vessel for cooking food that enables the calibration of the thermal flow as a function of the use destination of the cooking vessel.

These objects and others according to the present invention are achieved by providing a vessel for cooking food and a respective thermal signalling device as set forth in claim 1.

Further features of the invention are highlighted by the dependent claims, which are integral part of the present disclosure.

The features and advantages of a thermal signalling device for a vessel for cooking food according to the present invention will be more apparent from the following description, which is provided for explanatory non-limitative purposes, which makes reference to the attached schematic drawings, wherein.

Figure 1:
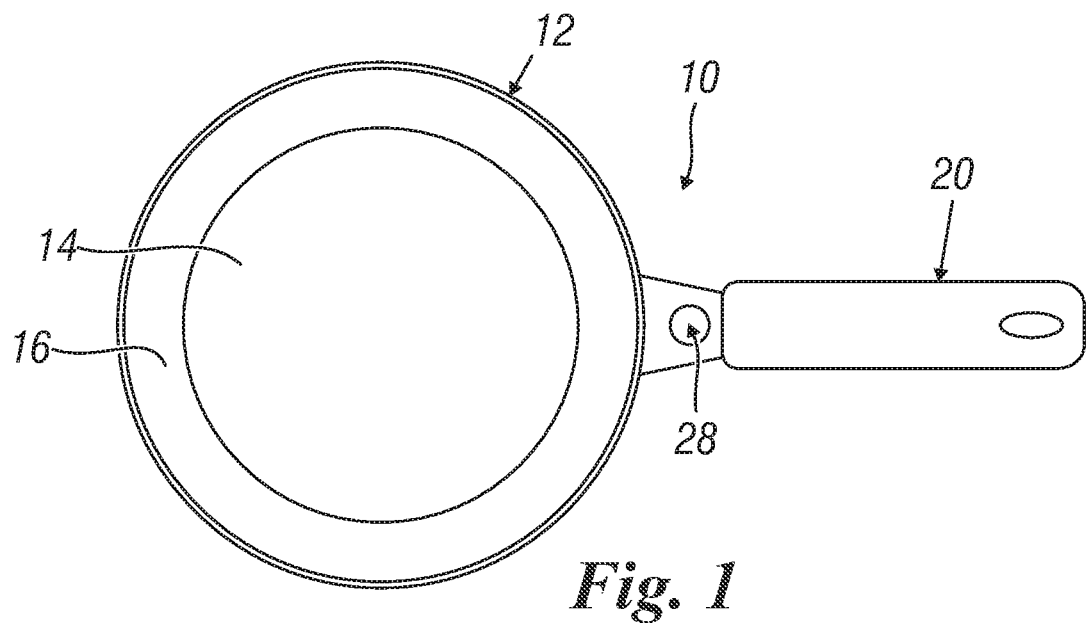
FIG. 1 is a top view of a vessel for cooking food provided with a first embodiment of the thermal signalling device according to the present invention.
Figure 2:
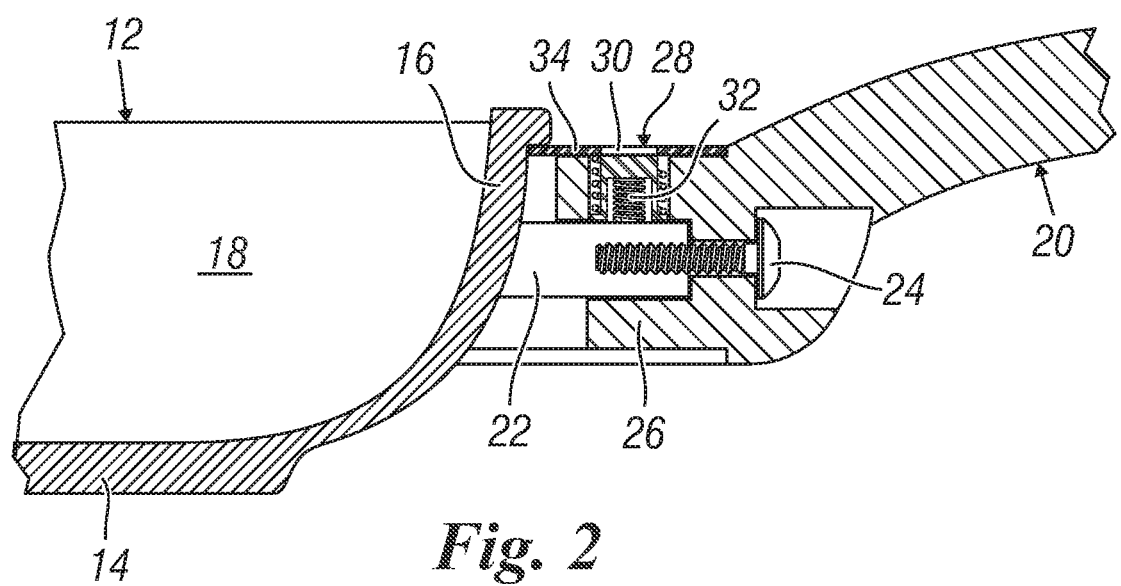
FIG. 2 is an enlarged cross-sectional view of a portion of the cooking vessel depicted in FIG. 1.

With reference to the figures, a vessel for cooking food and a respective thermal signalling device according to the present invention are shown. The vessel for cooking food is identified by the reference numeral 10 as a whole and is illustrated in the form of a pan for explanatory purposes only.

The cooking vessel 10 comprises a metal body 12 comprising in turn a bottom wall 14 and at least one side wall 16 which extends from such bottom wall 14. In the embodiment shown in the figures, the cooking vessel 10 is a conventional pan provided with a substantially circular bottom wall 14. The pan comprises one side wall 16 only which extends from the bottom wall 14 and, more specifically, from the circular edge of the bottom wall 14. In any case, the cooking vessel 10 might also be provided with a plurality of side walls 16, for example the cooking vessel 10 might have a bottom wall 14 featuring a quadrilateral shape. Irrespective of the shape of the cooking vessel 10, the side wall 16 extends from the bottom wall 14 in a conventional and intrinsically known manner, so as to define an inner compartment 18 of the cooking vessel 10 wherein food is placed for being cooked.

The cooking vessel 10 also comprises at least one handle 20, preferably made of a non-metal material. The handle 20 is constrained to a portion of the metal body 12, typically consisting of the side wall 16, via a metal fastening element 22. The handle 20 can in turn be constrained to the metal fastening element 22 by way of known systems, such as, for instance, a screw 24.

At least one thermal signalling device 28 is applied on a portion 26 of the handle 20 placed at a respective component having thermal conductivity properties, such as, for instance, the metal fastening element 22 or a metal fireproof ferrule 34 (illustrated more in details below). The thermal signalling device 28 is provided with at least one indicating element 30 and at least one respective actuating element 32 made of a shape-memory alloy (SMA). The indicating element 30 is operationally connected to its respective actuating element 32 and is preset for highlighting that a predefined thermal status of the cooking vessel 10 is reached by way of a mechanical movement of the actuating element 32, which activates when the cooking vessel reaches such predefined thermal status.

Figure 3:
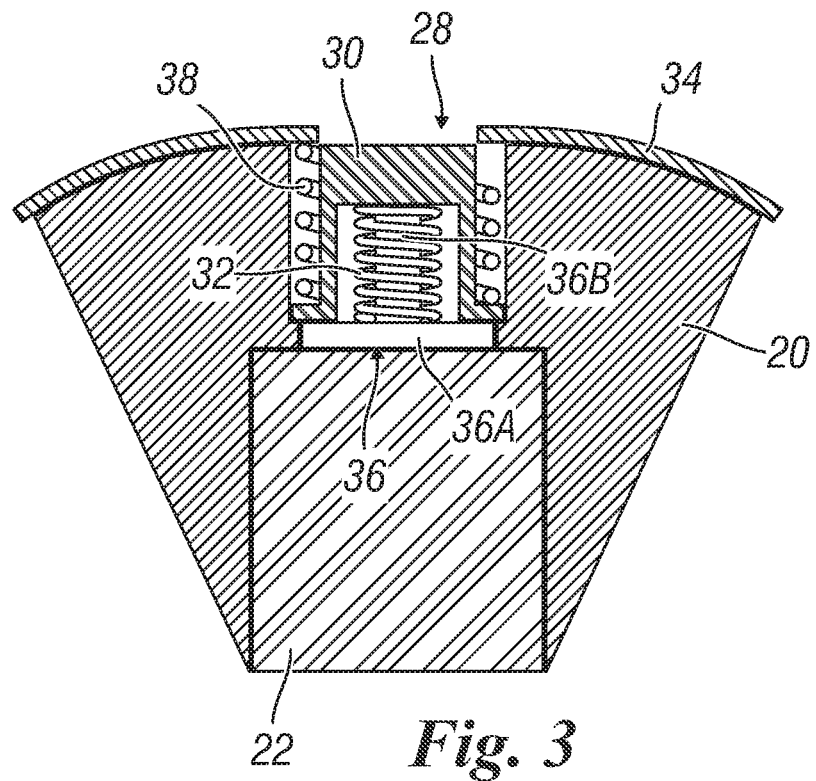
FIG. 3 is a schematic view of the thermal signalling device according to the present invention, shown in a first non-operative configuration.
Figure 4:
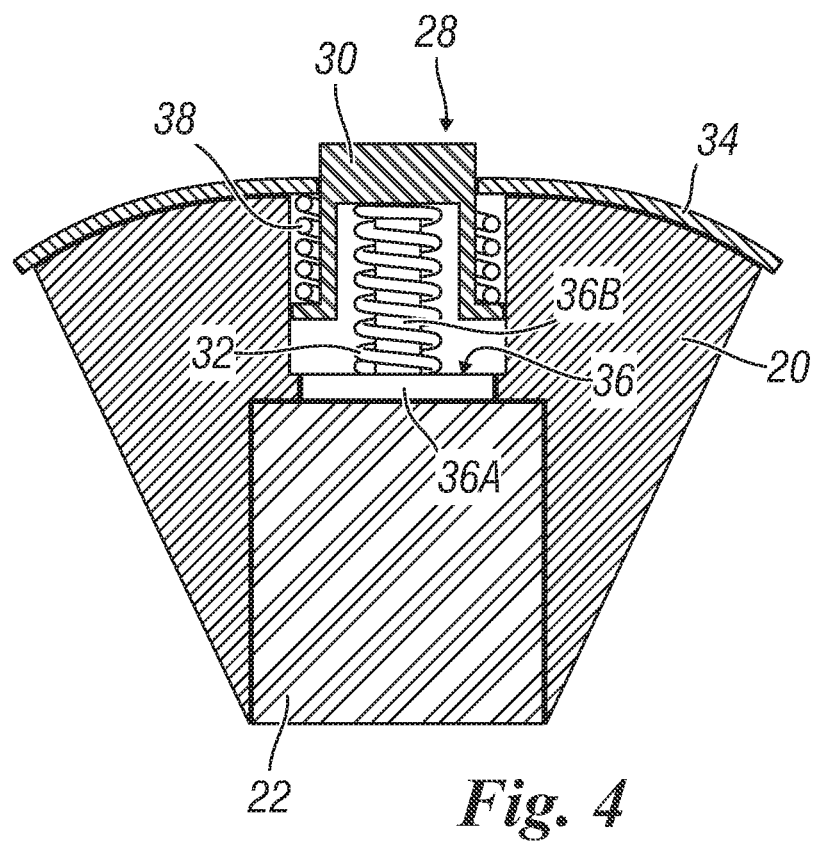
FIG. 4 is a schematic view of the thermal signalling device according to the present invention, shown in a second operative configuration.

The actuating element 32 consists of a shape-memory coil spring, placed in indirect contact with the component having thermal conductivity properties 22 or 34. The shape-memory coil spring 32 is preset for switching from a first non-operative configuration of the thermal signalling device 28 (FIG. 3), wherein such shape-memory coil spring 32 is not active, to a second operative configuration of the thermal signalling device 28 (FIG. 4), wherein such shape-memory coil spring 32 stretches when a predefined temperature value, which is specifically conceived and implemented, is reached. The predefined temperature value is assessed by a base portion of the shape-memory coil spring 32 that is placed in contact with the component having thermal conductivity properties 22 or 34 of the handle 20 by way of a thermal base 36 for modulation and/or thermal enhancement, as will be better described below.

In the embodiment shown in FIGS. 1 to 4, upon the attainment of the predefined temperature value the shape-memory coil spring 32 stretches, thus lifting the indicating element 30 that will come out from a hole made on a metal fireproof ferrule 34 arranged around the portion 26 of the handle 20 at which the thermal signalling device 28 is applied. The shape-memory coil spring 32 is made in such a way as to stretch upon the attainment of a predefined temperature value which, in the cooking vessel 10, is in the range of cooking temperatures. In a preferred embodiment of the invention, the predefined temperature value is set at approximately 80° C., assuming that this predefined temperature value corresponds to a temperature of the bottom wall 14 of approximately 180° C. when the cooking vessel 10 is in use.

In order to also make the thermal status achieved by the cooking vessel 10 chromatically evident, the indicating element 30 preferably consists of a cylindrical capsule, made of a metal or a techno-polymer and coloured with a predefined colour, preferably with a red colour, on its outer side surface. A further solution, simpler and more cost-effective to implement, in order to make the thermal status achieved by the cooking vessel 10 chromatically evident, might be to use a predefined colour, preferably selected from red and black, to colour only the upper surface of the cylindrical capsule, so as to highlight the presence of the indicating element 30 and to stimulate the observation of its subsequent active step conformation.

Alternatively, above the outer side surface of the cylindrical capsule 30 an O-ring can be placed, having a predefined colour, preferably red. As a further alternative, both the metal fireproof ferrule 34 and the outer upper surface of the cylindrical capsule 30 might be coloured with the same colour (for instance, black). In this case, when the cylindrical capsule 30 lifts by the temperature effect, its respective outer side surface is highlighted.

Advantageously, between the actuating element 32 and the component provided with thermal conductivity properties, which in the embodiment shown in FIGS. 1 to 4 consists of the metal fastening element 22, a metal base 36 for modulation and/or thermal enhancement is interposed.

Such metal base 36 for modulation and/or thermal enhancement is hence in direct contact with the hot metal fastening element 22 of the cooking vessel 10, so as to allow for a thermal conduction to the actuating element 32. Should the actuating element 32 be formed by a shape-memory coil spring, the metal base 36 for modulation and/or thermal enhancement might be provided, as well as with a disc 36A interposed between the actuating element 32 and the metal fastening element 22, also with a central guiding pin 36B which is inserted in the turns of the shape-memory coil spring 32. In this way, the metal base 36 for modulation and/or thermal enhancement, shaped as a mushroom, can transfer the heat by contact with the shape-memory coil spring 32 both through the disc 36A and through the central guiding pin 36B.

In order to be able to thermally compare the vessel for cooking 10 having different geometric (hence, also thermal) conformation, it is possible to calibrate the thermal flow as a function of the thermal conductivity of the metal used to manufacture the metal base 36 for modulation and/or thermal enhancement, as well as of its respective thickness. Likewise, it will be possible to calibrate the thermal flows as a function of the different type of destination of use of the vessel for cooking 10, for instance of electric or gas source.

In order to come back to the first non-operative configuration starting from the respective second operative configuration, i.e. when the cooking vessel 10 has cooled down, the thermal signalling device 28 is provided with a return spring 38 ("bias spring"). The return spring 38 is interposed between the indicating element 30 and a fixed portion of the cooking vessel 10, such as, for instance, in the embodiment depicted in FIGS. 1 to 4, the metal fireproof ferrule 34 of the handle 20. The return spring 38 is preset to make the actuating element 32 come back in its initial shape (FIG. 3), by simultaneously allowing the indicating element 30 to come back just as quickly into its own seat, so that it is ready for a new use. The actuating shape-memory element 32 shall be calibrated in such a way as to enable the return in its initial position of the respective indicating element 30 in a safety thermal regime, defined for metals in a temperature value of 55° C.

Figure 5:
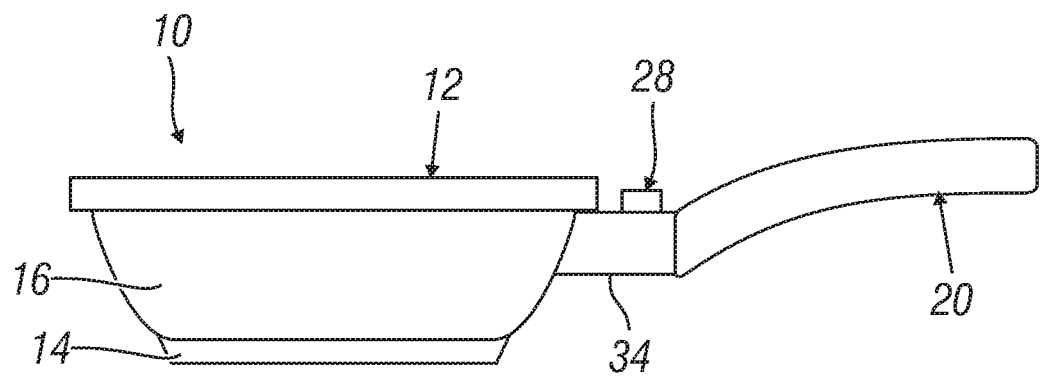
FIG. 5 is a side view of a vessel for cooking food provided with a second embodiment of the thermal signalling device according to the present invention.
Figure 6:
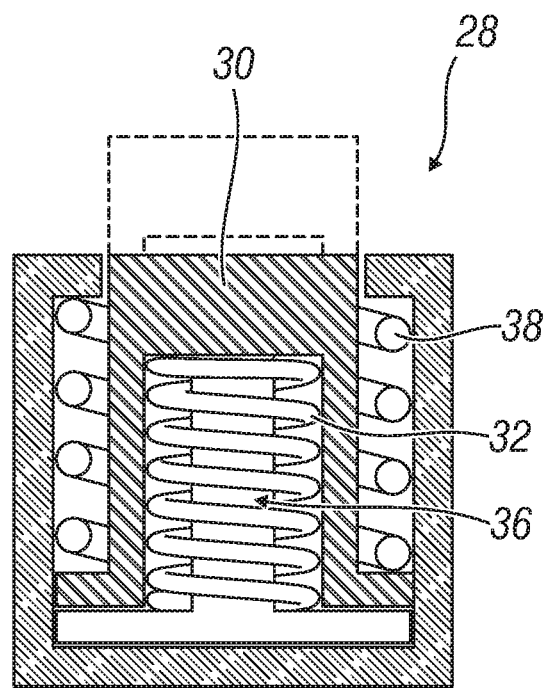
FIG. 6 is a cross sectional view of the thermal signalling device depicted in FIG. 5.

FIGS. 1 to 4 show a preferred embodiment of the thermal signalling device 28, which is embedded in the handle at the metal fireproof ferrule 34 and which is in thermal contact with its respective metal fastening element 22. Alternatively, as shown in FIGS. 5 and 6, the thermal signalling device 28 might also be manufactured as a separate component with respect to the handle 20.

In this alternative embodiment, the thermal signalling device 28 comprises a casing 40 containing its respective functional elements (indicating element 30, actuating element 32, return spring 38, and metal base 36 for modulation and/or thermal enhancement). The casing 40 can be applied, in a fixed or removable way, to the upper back of the metal fireproof ferrule 34 (FIGS. 5 and 6), and, in such an event, it operates as a component provided with thermal conductivity properties. If the casing 40 shall be applied to the upper back of the metal fireproof ferrule 34 in a removable way, it shall be provided with magnet fastening means.

It has been thus demonstrated that the thermal signalling device for a vessel for cooking food according to the present invention achieves the previous highlighted objects, and specifically offers the following advantages:

the movement of the indicating element, imparted by the actuating element made of a shape-memory alloy, provides repetitiveness, reliability, and stability;

there are no alterable components, such as, for instance, thermochromic pigments, or fragile electronic circuits;

the priority reading is of a physical, not chromic, type (lifting of the indicating element);

the thermal signalling device comprises simple components (two small springs, one small cap made of metal or techno-polymer, one mushroom-shape metal component, and possibly one casing) and its reduced dimensions make it possible to reduce costs;

despite its simplicity, the thermal signalling device uses an advanced and complex metallurgic technology (programmed-deformation metal), besides the possibility of calibrating the thermal flow;

it is possible to select a shape-memory spring specific for the cooking vessel, its function, and its heating source. For example, the quick heating of an induction pan increases the temperature difference between the bottom and the periphery, whereby the pan can be equipped with a shape-memory spring which is activated at a lower temperature.

Also, there are significant differentiating and innovative elements with respect to known thermal signalling systems based on SMA components such as, for instance, that described in document KR 2013-0068095 A, summarized here below:

the system described in document KR 2013-0068095 A uses a sheet instead of a spring, the latter placed outside the joining element rather than the fixed inner element, in a thermally more stable and reliable way;

the system described in document KR 2013-0068095 A does not use a return spring to recover the initial shape of the actuating element, which in the shape-memory materials is not provided unless manually or automatically exerted;

the possibility to insert elements for adjusting the temperature in order to calibrate the thermal flow is not provided.

The thus conceived thermal signalling device for a vessel for cooking food according to the present invention is in any case susceptible of numerous modifications and variants, all falling within one and the same inventive concept; also, all details can be replaced by technically equivalent elements. In practice, the materials used, as well as the shapes and dimensions, might be whatsoever depending on the technical requirements.

Therefore, the scope of protection of the invention is that set forth in the attached claims.

The invention claimed is:

1. A cooking vessel for cooking foods, comprising:
a metal body comprising a bottom wall and at least one side wall, wherein said at least one side wall extends from said bottom wall to form an inner compartment of the cooking vessel into which food is arranged for being cooked;
a handle, constrained to a portion of the metal body by a metal fastening element;
a thermal signalling device applied to a portion of the handle arranged at a respective component having thermal conductivity properties, said thermal signalling device being provided with at least one an indicating element and with a respective actuating element made of a shape-memory alloy;
a metal base for modulation and/or thermal enhancement, interposed between said actuating element and said component having thermal conductivity properties,
wherein the indicating element is operatively connected to the respective actuating element and is configured for highlighting that the cooking vessel has achieved a predefined thermal state through a mechanical movement of the respective actuating element, which is activated when said predefined thermal state is achieved, wherein the respective actuating element is a shape-memory coil spring, indirectly contacting said component having thermal conductivity properties, said shape-memory coil spring being configured for switching from a first non-operative configuration of the thermal signalling device, wherein said shape-memory coil spring is inactive, to a second operative configuration of the thermal signalling device, wherein said shape-memory coil spring is stretched when a predefined temperature value is achieved, and said metal base for modulation and/or thermal enhancement is arranged in direct contact with said component having thermal conductivity properties to transfer heat to said shape-memory coil spring, and wherein the metal base for modulation and/or thermal enhancement is provided with a disc, interposed between said shape-memory coil spring and said component having thermal conductivity properties, and with a central guiding pin, which fits into the coils of said shape-memory coil spring, so that said metal base for modulation and/or thermal enhancement has a mushroom shape and may transfer heat by contact with the shape-memory coil spring, both through the disc and through the central guiding pin.

2. The cooking vessel according to claim 1, wherein the thermal signalling device is provided with a return spring, interposed between the indicating element and a fixed portion of the cooking vessel, said return spring being configured for rapidly restoring the shape-memory coil spring to its original shape.

3. The cooking vessel according to claim 1, wherein the shape-memory coil spring is made to be stretched when a predefined temperature value is achieved, which in the cooking vessel corresponds to the cooking temperature range.

4. The cooking vessel according to claim 3, wherein said predefined temperature value is set to about 80° C., said predefined temperature value corresponding to a temperature of the bottom wall which is about 180° C. when the cooking vessel is in use.

5. The cooking vessel according to claim 1, wherein the shape-memory coil spring is calibrated so that the shape-memory coil spring enables the respective indicating element to be restored to the respective indicating element's initial position in a safe thermal regime, defined for metals at a temperature value of 55° C.

6. The cooking vessel according to claim 1, wherein the component having thermal conductivity properties consists of the metal fastening element.

7. The cooking vessel according to claim 6, wherein the indicating element consists of a cylindrical capsule, made of metal or of a techno-polymer and configured for rising from a hole made on a metal fireproof ferrule arranged around said portion of the handle where the thermal signalling device is applied.

8. The cooking vessel according to claim 7, wherein the cylindrical capsule is provided with an outer side surface having a predefined colour.

9. The cooking vessel according to claim 7, wherein the cylindrical capsule is provided with an upper surface having a predefined colour.

10. The cooking vessel according to claim 7, wherein the cylindrical capsule is provided with an outer side surface on which an O-ring having a predefined colour is arranged.

11. The cooking vessel according to claim 7, wherein both the metal fireproof ferrule and an upper surface of the cylindrical capsule are of the same colour, so that when the cylindrical capsule rises under the effect of the temperature, the respective outer side surface stands out.

12. The cooking vessel according to claim 1, wherein the thermal signalling device is manufactured as a separate component with respect to the handle and comprises a casing containing the indicating element and the respective actuating element.

13. The cooking vessel according to claim 12, wherein said casing is applied, either fixedly or removably, to the upper back of a metal fireproof ferrule forming said component having thermal conductivity properties.

14. The cooking vessel according to claim 13, wherein said casing, when applied removably to the upper back of the metal fireproof ferrule, is provided with magnetic fastening means.

15. The cooking vessel according to claim 7, wherein the cylindrical capsule is provided with an upper surface having a colour selected from red or black.

16. The cooking vessel according to claim 7, wherein the cylindrical capsule is provided with an outer side surface on which an O-ring having a red colour, is arranged.

17. A cooking vessel for cooking foods, comprising:
a metal body comprising a bottom wall and at least one side wall, wherein said at least one side wall extends from said bottom wall to form an inner compartment of the cooking vessel into which food is arranged for being cooked;
a handle, constrained to a portion of the metal body by a metal fastening element;
a thermal signalling device applied to a portion of the handle arranged at a respective component having thermal conductivity properties, said thermal signalling device being provided with at least one an indicating element and with a respective actuating element made of a shape-memory alloy;
a metal base for modulation and/or thermal enhancement, interposed between said actuating element and said component having thermal conductivity properties,
wherein the indicating element is operatively connected to the respective actuating element and is configured for highlighting that the cooking vessel has achieved a predefined thermal state through a mechanical movement of the respective actuating element, which is activated when said predefined thermal state is achieved,
wherein the respective actuating element is a shape-memory coil spring, indirectly contacting said component having thermal conductivity properties, said shape-memory coil spring being configured for switching from a first non-operative configuration of the thermal signalling device, wherein said shape-memory coil spring is inactive, to a second operative configuration of the thermal signalling device, wherein said shape-memory coil spring is stretched when a predefined temperature value is achieved, and said metal base for modulation and/or thermal enhancement is arranged in direct contact with said component having thermal conductivity properties to transfer heat to said shape-memory coil spring,
wherein the component having thermal conductivity properties consists of the metal fastening element, wherein the indicating element consists of a cylindrical capsule, made of metal or of a techno-polymer and configured for rising from a hole made on a metal fireproof ferrule arranged around said portion of the handle where the thermal signalling device is applied.

18. A cooking vessel for cooking foods, comprising:
a metal body comprising a bottom wall and at least one side wall, wherein said at least one side wall extends from said bottom wall to form an inner compartment of the cooking vessel into which food is arranged for being cooked;
a handle, constrained to a portion of the metal body by a metal fastening element;
a thermal signalling device applied to a portion of the handle arranged at a respective component having thermal conductivity properties, said thermal signalling device being provided with at least one an indicating element and with a respective actuating element made of a shape-memory alloy;
a metal base for modulation and/or thermal enhancement, interposed between said actuating element and said component having thermal conductivity properties,
wherein the indicating element is operatively connected to the respective actuating element and is configured for highlighting that the cooking vessel has achieved a predefined thermal state through a mechanical movement of the respective actuating element, which is activated when said predefined thermal state is achieved,
wherein the respective actuating element is a shape-memory coil spring, indirectly contacting said component having thermal conductivity properties, said shape-memory coil spring being configured for switching from a first non-operative configuration of the thermal signalling device, wherein said shape-memory coil spring is inactive, to a second operative configuration of the thermal signalling device, wherein said shape-memory coil spring is stretched when a predefined temperature value is achieved, and said metal base for modulation and/or thermal enhancement is arranged in direct contact with said component having thermal conductivity properties to transfer heat to said shape-memory coil spring,
wherein the thermal signalling device is manufactured as a separate component with respect to the handle and comprises a casing containing the indicating element and the respective actuating element,
wherein said casing is applied, either fixedly or removably, to the upper back of a metal fireproof ferrule forming said component having thermal conductivity properties,
wherein said casing, when applied removably to the upper back of the metal fireproof ferrule, is provided with magnetic fastening means.

* * * * *